United States Patent
Yamada et al.

(10) Patent No.: US 10,400,993 B2
(45) Date of Patent: Sep. 3, 2019

(54) METHOD OF MANUFACTURING FLUORESCENT-MATERIAL-CONTAINING MEMBER

(71) Applicant: NICHIA CORPORATION, Anan-shi, Tokushima (JP)

(72) Inventors: Shoichi Yamada, Anan (JP); Takayoshi Wakaki, Anan (JP); Masahiko Sano, Anan (JP)

(73) Assignee: NICHIA CORPORATION, Anan-shi (JP)

( * ) Notice: Subject to any disclaimer, the term of this patent is extended or adjusted under 35 U.S.C. 154(b) by 154 days.

(21) Appl. No.: 15/440,292

(22) Filed: Feb. 23, 2017

(65) Prior Publication Data

US 2017/0241621 A1 Aug. 24, 2017

(30) Foreign Application Priority Data

Feb. 24, 2016 (JP) .................................. 2016-032775
Nov. 16, 2016 (JP) .................................. 2016-222875

(51) Int. Cl.
  *F21V 13/02* (2006.01)
  *F21K 9/64* (2016.01)
  (Continued)

(52) U.S. Cl.
  CPC .............. *F21V 13/02* (2013.01); *C09K 11/00* (2013.01); *C09K 11/0838* (2013.01); *F21K 9/64* (2016.08);
  (Continued)

(58) Field of Classification Search
  None
  See application file for complete search history.

(56) References Cited

U.S. PATENT DOCUMENTS

2008/0049430 A1   2/2008  Sakumoto
2011/0063592 A1*  3/2011  Ezura ................ C09K 11/7748
                                                    355/53
(Continued)

FOREIGN PATENT DOCUMENTS

EP   3147955 A1   3/2017
JP   06-144941 A  5/1994
(Continued)

OTHER PUBLICATIONS

Search Report of the corresponding British patent application No. GB1702843.2, dated Jul. 24, 2017.
(Continued)

*Primary Examiner* — Katie L. Hammer
(74) *Attorney, Agent, or Firm* — Global IP Counselors, LLP

(57) ABSTRACT

A method of manufacturing a fluorescent-material-containing member includes: providing a fluorescent member including a fluorescent material, the fluorescent member having a first main surface side including a plurality of projections; disposing a powder of a light-reflective member between the projections of the fluorescent member; obtaining a sintered body by sintering the powder of the light-reflective member, and removing part of the sintered body from at least one of a first main surface side and a second main surface side of the fluorescent member to obtain the fluorescent-material-containing member including a first surface arranged on the first main surface side has and defined by the fluorescent member and the light-reflective member, and a second surface arranged on the second main surface side has and defined by the fluorescent member and the light-reflective member or defined solely by the fluorescent member.

29 Claims, 14 Drawing Sheets

(51) Int. Cl.
*F21K 9/68* (2016.01)
*F21V 7/00* (2006.01)
*F21V 9/16* (2006.01)
*C09K 11/08* (2006.01)
*F21K 9/90* (2016.01)
*C09K 11/00* (2006.01)

(52) U.S. Cl.
CPC .................. *F21K 9/68* (2016.08); *F21K 9/90* (2013.01); *F21V 7/00* (2013.01)

(56) References Cited

U.S. PATENT DOCUMENTS

| | | | |
|---|---|---|---|
| 2011/0157865 | A1 | 6/2011 | Takahashi et al. |
| 2011/0235339 | A1 | 9/2011 | Shyu et al. |
| 2013/0163225 | A1* | 6/2013 | Nakatsu ............... G03B 21/204 362/84 |
| 2014/0085923 | A1 | 3/2014 | Nakazato |
| 2014/0362570 | A1* | 12/2014 | Miyoshi .................... F21K 9/68 362/240 |
| 2015/0029725 | A1* | 1/2015 | Kamikawa ............. H01L 33/60 362/293 |
| 2016/0087167 | A1 | 3/2016 | Kundaliya et al. |
| 2016/0153624 | A1* | 6/2016 | Yajima ...................... F21K 9/64 362/84 |

FOREIGN PATENT DOCUMENTS

| | | | |
|---|---|---|---|
| JP | 2004-101367 | A | 4/2004 |
| JP | 2011-021062 | A | 2/2011 |
| JP | 2011-054795 | A | 3/2011 |
| JP | 2011-091068 | A | 5/2011 |
| JP | 2013089703 | A | 5/2013 |
| JP | 2014-067961 | A | 4/2014 |
| JP | 2014-099625 | A | 5/2014 |
| JP | 2014-107351 | A | 6/2014 |
| KR | 20140054626 | A | 5/2014 |

OTHER PUBLICATIONS

Combined Search and Examination Report of the corresponding British patent application No. GB1716774.3, dated Nov. 30, 2017.

* cited by examiner

METHOD OF MANUFACTURING FLUORESCENT-MATERIAL-CONTAINING MEMBER

CROSS-REFERENCE TO RELATED APPLICATIONS

This application claims priority to Japanese Patent Application No. 2016-32775 filed on Feb. 24, 2016, and Japanese Patent Application No. 2016-222875 filed on Nov. 16, 2016, which are hereby incorporated herein by reference in their entireties.

BACKGROUND

The present disclosure relates to a method of manufacturing a fluorescent-material-containing member.

In light-emitting device disclosed in Japanese Unexamined Patent Application Publication No. 2014-67961, a ceramic wavelength conversion member (corresponding to "fluorescent member" in the present specification) is secured to a through hole of holder (corresponding to "light-reflective member" in the present specification) with adhesive.

To manufacture such member, there is a need for forming the through hole in the holder, shaping the wavelength conversion member to fit the shape of the through hole, and then precisely securing the shaped wavelength conversion member to the through hole of the holder. In other words, cumbersome steps are required, and manufacturing with good reproducibility is difficult because the shape of the wavelength conversion member is required to fit the shape of the through hole in the holder.

SUMMARY

A method of manufacturing a fluorescent-material-containing member according to one embodiment of the present invention includes: providing a fluorescent member including a fluorescent material, the fluorescent member having a first main surface side including a plurality of projections and a second main surface side opposite to the first main surface side; disposing a powder of a light-reflective member between the projections of the fluorescent member; obtaining a sintered body by sintering the powder of the light-reflective member, the sintered body including the light-reflective member integrally formed with the fluorescent member; and removing part of the sintered body from at least one of the first main surface side and the second main surface side of the fluorescent member to obtain a fluorescent-material-containing member, the fluorescent-material-containing member including a first surface arranged on the first main surface side and defined by the fluorescent member and the light-reflective member, and a second surface arranged on the second main surface side and defined by the fluorescent member and the light-reflective member or defined solely by the fluorescent member.

A method of manufacturing a fluorescent-material-containing member according to another embodiment of the present invention includes: providing a light-reflective member having a first main surface side constituting a plurality of depressions and a second main surface side opposite to the first main surface side; disposing a powder of a fluorescent member containing a fluorescent material in the depressions of the light-reflective member; obtaining a sintered body by sintering the powder of the fluorescent member, the sintered body including the light-reflective member integrally formed with the fluorescent member; and removing part of the sintered body from at least the second main surface side of the light-reflective member to obtain a fluorescent-material-containing member, the fluorescent-material-containing member including a second surface arranged on the second main surface side and defined by the fluorescent member and the light-reflective member, and a first surface arranged on the first main surface side and defined by the fluorescent member and the light-reflective member or defined solely by the fluorescent member.

A method of manufacturing a fluorescent-material-containing member according to still another embodiment of the present invention includes: providing a light-reflective member having a plurality of through holes penetrating through a first main surface and a second main surface positioned opposite side from the first main surface; disposing a powder of the fluorescent member including a fluorescent material in the through holes; obtaining a sintered body by sintering the powder of the fluorescent member, the sintered body including the light-reflective member integrally formed with the fluorescent member; and removing part of the sintered body from at least one of a first main surface side and a second main surface side of the light-reflective member to obtain a fluorescent-material-containing member so that the fluorescent-material-containing member includes a first surface arranged on the first main surface side and defined by the fluorescent member and the light-reflective member, and a second surface arranged on the second main surface side and defined by the fluorescent member and the light-reflective member or defined solely by the fluorescent member.

The above methods enable manufacturing of a fluorescent-material-containing member in which a light-reflective member is disposed around a fluorescent member to be comparatively easy and to exhibit good reproducibility.

DETAILED DESCRIPTION OF EMBODIMENTS

Figure 1:
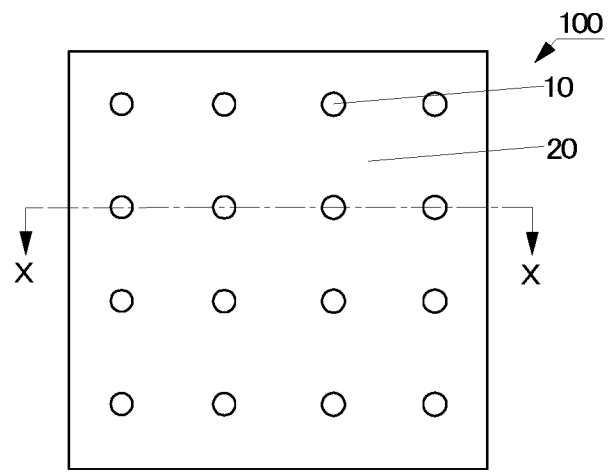
FIG. 1 is a schematic top view of a fluorescent-material-containing member according to a first embodiment.

The following describes embodiments of the present invention referring to the drawings. The embodiments below are intended to embody the technical concept of the present invention and are not intended to limit the present invention. There is a case where sizes or positional relations of members illustrated in each drawing are exaggerated in order to clarify the descriptions.

Terms such as "a powder of a fluorescent member" and "sintered fluorescent member" are used herein. A fluorescent member is referred to as a "fluorescent member" regardless of its state. In the same manner, terms such as "a powder of a light-reflective member" and "sintered light-reflective member" are used herein. A light-reflective member is referred to as a "light-reflective member" regardless of its state. A term "fluorescent-material-containing member" is used herein regardless of whether singulation is performed.

First Embodiment

Figure 2:
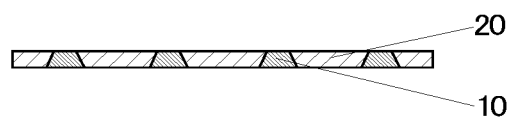
FIG. 2 is a schematic cross-sectional view taken along the line X-X in FIG. 1.

FIG. 1 is a schematic view (schematic top view) taken from the first main surface side of a fluorescent-material-containing member 100 obtained by a manufacturing method according to the present embodiment. FIG. 2 is a schematic cross-sectional view taken along the line X-X in FIG. 1. FIG. 3A to FIG. 3I illustrate the method of manufacturing the fluorescent-material-containing member 100. FIG. 3J shows obtaining a fluorescent-material-containing member 100a by singulating the fluorescent-material-containing member 100.

The method of manufacturing the fluorescent-material-containing member 100 includes providing a fluorescent member 10 including a fluorescent material, the fluorescent member having a first main surface side constituting a plurality of projections and a second main surface side opposite to the first main surface side, providing a powder of a light-reflective member 20, disposing the powder of the light-reflective member 20 between the projections of the fluorescent member 10, obtaining a sintered body by sintering the powder of the light-reflective member 20, the sintered body including the light-reflective member 20 integrally formed with the fluorescent member 10, and removing part of the sintered body from at least one of the first main surface side and the second main surface side of the fluorescent member 10 to obtain a fluorescent-material-containing member 100, the fluorescent-material-containing member 100 including a first surface arranged on the first main surface side and defined by the fluorescent member 10 and the light-reflective member 20, and a second surface arranged on the second main surface side and defined by the fluorescent member 10 and the light-reflective member 20 or defined solely by the fluorescent member 10.

The above method enables manufacturing of the fluorescent-material-containing member 100 that includes the fluorescent member 10 and the light-reflective member 20 surrounding the fluorescent member 10 to be comparatively easy and to exhibit good reproducibility.

In conventional methods of manufacturing fluorescent-material-containing member, through hole is formed in light-reflective member, sintered fluorescent member is shaped to fit the through hole, and then the shaped fluorescent member is secured to an inner wall of the light-reflective member with adhesive. These methods, however, necessitate forming the through hole in the light-reflective member, sintering the fluorescent member, shaping the fluorescent member, and securing the fluorescent member to the light-reflective member. Accordingly, the procedure becomes cumbersome and takes time to manufacture the fluorescent-material-containing member. In addition, manufacturing the fluorescent-material-containing members with good reproducibility is difficult because the shape of the fluorescent member is required to precisely fit the shape of the through hole of the light-reflective member.

Whereas, in the manufacturing method according to the present embodiment, the powder of the light-reflective member 20 is disposed between the plurality of projections of the fluorescent member 10, and the powder of the light-reflective member 20 is sintered to form the sintered body in which the fluorescent member 10 and the light-reflective member 20 are integrally formed. Part of the sintered body is then removed to manufacture the fluorescent-material-containing member 100. In other words, employing the powdered light-reflective member 20 enables the fluorescent-material-containing member 100 to be manufactured without shaping the light-reflective member 20 into a specific shape, thereby simplifying the procedure. In addition, employing the powdered light-reflective member 20 enables the fluorescent-material-containing member 100 to be manufactured with good reproducibility because the fluorescent member 10 is not required to be aligned with the light-reflective member 20. In particular, since the powder of the light-reflective member 20 is sintered in the manufacturing method according to the present embodiment, the fluorescent member 10 is directly coupled to the light-reflective member 20 in the resulting fluorescent-material-containing member 100. In other words, any member such as an adhesive other than the fluorescent member 10 and the light-reflective member 20 is not present between the fluorescent member 10 and the light-reflective member 20. This constitution also enables heat generated by irradiation of the fluorescent member 10 with light to be efficiently transferred to the light-reflective member 20.

(Steps Before Providing Fluorescent Member 10)

Figure 3A:
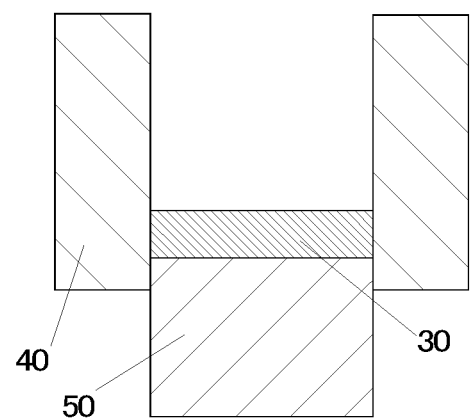
FIG. 3A is a schematic cross-sectional view for illustrating a method of manufacturing the fluorescent-material-containing member according to the first embodiment.

In the present embodiment, a powdered material such as the same material as for the light-reflective member 20 is disposed as a buffering member 30 in a container before providing the fluorescent member 10, as shown in FIG. 3A. In the present embodiment, a sintering die 40 and a lower punch 50 are used for the container. The buffering member 30 is not essential, but use of the buffering member 30 can reduce cracking or the like of the sintered fluorescent member 10. With the buffering member 30, a pressure applied on the fluorescent member 10 during subsequent sintering of the light-reflective member 20 can be substantially uniform even when the sintered fluorescent member 10 is used.

Figure 3B:
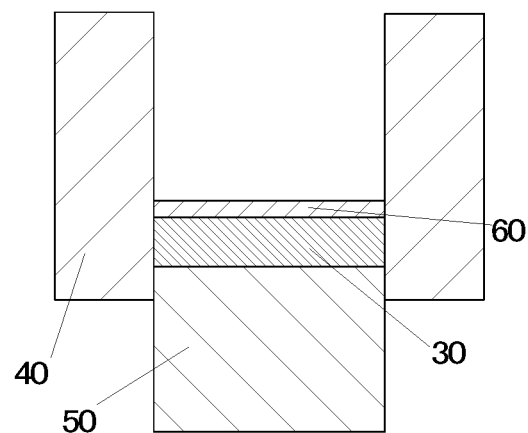
FIG. 3B is a schematic cross-sectional view for illustrating the method of manufacturing the fluorescent-material-containing member according to the first embodiment.
Figure 3C:
FIG. 3C is a schematic cross-sectional view for illustrating the method of manufacturing the fluorescent-material-containing member according to the first embodiment.
Figure 3D:
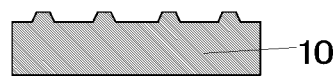
FIG. 3D is a schematic cross-sectional view for illustrating the method of manufacturing the fluorescent-material-containing member according to the first embodiment.

Subsequently, a mold release sheet 60 is disposed on the buffering member 30 as shown in FIG. 3B so that the sintered body made of the fluorescent member 10 and the light-reflective member 20 is easily removed from the container at a subsequent step. For example, a polyethylene sheet or a carbon sheet can be used for the mold release sheet 60.

(Providing Fluorescent Member 10)

Figure 3E:
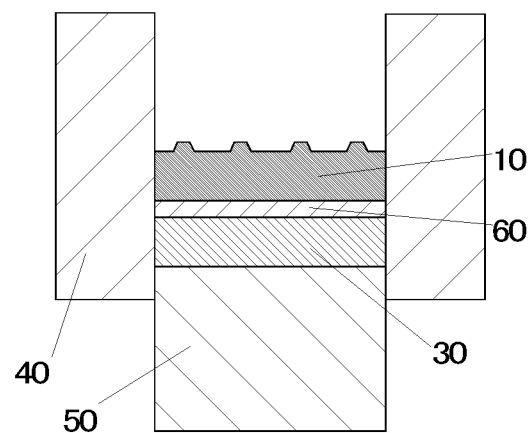
FIG. 3E is a schematic cross-sectional view for illustrating the method of manufacturing the fluorescent-material-containing member according to the first embodiment.

Subsequently, the fluorescent member 10 including a plurality of projections of the first main surface side is provided as shown in FIG. 3E.

In the present embodiment, in providing the fluorescent member 10, a mixture of a powder of a fluorescent material and a powder of a sintering agent containing the same material as for the light-reflective member is sintered to provide the sintered fluorescent member 10 including a plurality of projections of the first main surface side. In the present embodiment, a $Y_3Al_5O_{12}$:Ce (yttrium-aluminum-garnet-based, i.e., YAG-based) fluorescent material and a sintering agent that contains aluminum oxide are used for the fluorescent member 10, and aluminum oxide is used for the light-reflective member 20.

In the present embodiment, a plurality of projections are formed on the sintered fluorescent member 10 in providing the fluorescent member 10, thereby providing the fluorescent member 10 including a plurality of projections of the first main surface side. In other words, a plate-shaped sintered fluorescent member 10 is first produced as shown in FIG. 3C, and a plurality of projections are then formed on the plate-shaped sintered fluorescent member 10 as shown in FIG. 3D. This procedure enables the shape of the projections to be designed comparatively freely. The sintered fluorescent member 10 having a plurality of projections may be formed by sintering a powder of a fluorescent member using a sintering mold (including an upper punch 50, the lower punch 50, and the sintering die 40) having a predetermined shape so that a plurality of projections is formed.

The shortest distance between a lateral surface of one projection and a lateral surface of an adjacent projection of the fluorescent member 10 is preferably equal to or more than 0.7 mm. This constitution facilitates filling the light-reflective member 20 between adjacent projections in disposing the powder of the light-reflective member 20.

The projections can have, for example, a circular, an ellipsoidal, or a rectangular shape viewed from the top. In the present embodiment, the shape in a top view of the projections is a circle. The width at the top of one projection is smaller than the width at the bottom (i.e., base) of the projection. In other words, the side surface of the projection is inclined so that the width of the projection becomes smaller from the lower side, which is the bottom, toward the upper side, which is the top. For example, the width at the top of the projection can be in the range of equal to or more than 0.1 mm and equal to or less than 1.2 mm. The width at the bottom of the projection can be in the range of equal to or more than 0.5 mm and equal to or less than 10 mm. The projections are preferably formed with a machining center. This is because projections having a comparatively small width and projections having inclined side surfaces can be precisely shaped.

Figure 4A:
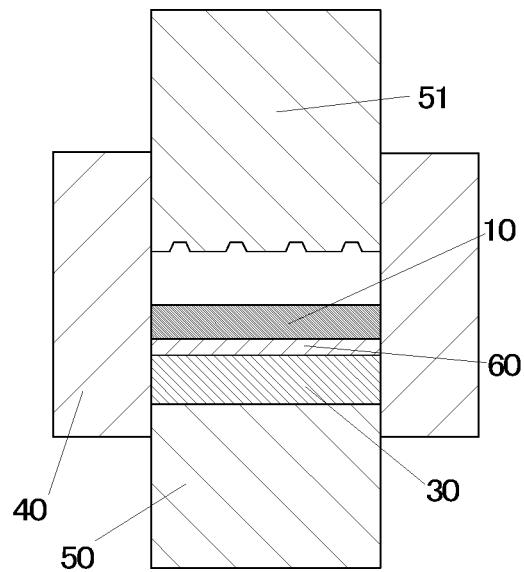
FIG. 4A is a schematic cross-sectional view for illustrating another method of providing a fluorescent member.
Figure 4B:
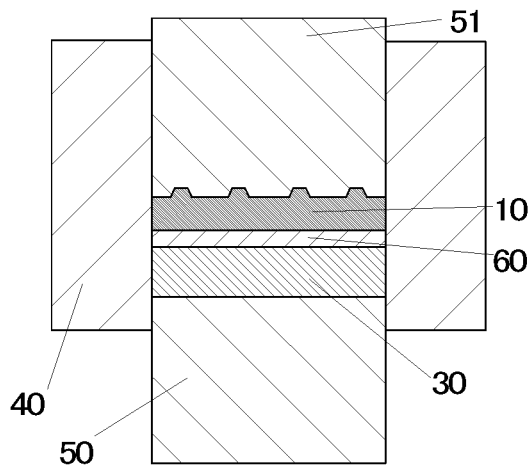
FIG. 4B is a schematic cross-sectional view for illustrating another method of providing the fluorescent member.
Figure 4C:
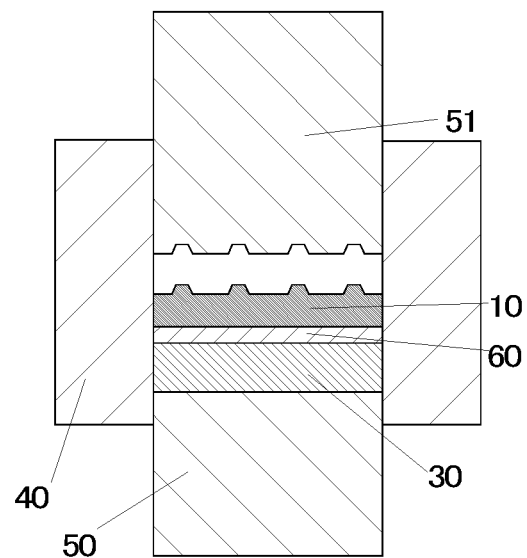
FIG. 4C is a schematic cross-sectional view for illustrating another method of providing the fluorescent member.

In the present embodiment, the sintered fluorescent member 10 is provided in providing the fluorescent member 10, but the powdered fluorescent member 10 can be provided as shown in FIG. 4A to FIG. 4C. In this case, providing the fluorescent member 10 includes filling the container with the powdered fluorescent member 10 that contains the fluorescent material in a container (shown in FIG. 4A), and producing the fluorescent member 10 constituting a plurality of projections formed by pressing the powder of the fluorescent member 10 with a pressing member 51 that has a plurality of depressions to form the projections of the fluorescent member (shown in FIG. 4B and FIG. 4C). Then, in obtaining the sintered body, both the fluorescent member 10 and the light-reflective member 20 are sintered. Use of the pressing member 51 having a plurality of depressions can form the fluorescent member 10 that maintains a certain shape, which has a plurality of projections as a whole, while being in a powdered state. Thus, the procedure can be simplified compared with the case where the plate-shaped sintered fluorescent member 10 is used.

The openings of the depressions in the pressing member 51 can have, for example, a circular, an ellipsoidal, or a rectangular shape. The openings of the depressions in the pressing member 51 are preferably formed so that each of the openings becomes wider as further away from the bottom surface of a corresponding one of the depressions. In other words, the width of each of the depressions preferably becomes larger as further away from the surface that presses the fluorescent member 10. This constitution facilitates releasing of the fluorescent member 10 from the pressing member 51. The mold release sheet may be present between the pressing member 51 and the powdered fluorescent member 10. This constitution reduces the risk that the fluorescent member 10 might remain in the depressions in releasing the fluorescent member 10 from the pressing member 51.

The fluorescent material contained in the fluorescent member 10 can be selected as appropriate depending on the desired fluorescent color. For example, a garnet based fluorescent material can be used that contains at least one element selected from the group consisting of Y, Lu, Sc, La, Tb, and Gd and at least one element selected from the group consisting of Al, Ga, and In, and is activated with at least one element selected from the group consisting of Ce, Cr, Nd, and Eu. In the case where the light-reflective member 20 contains aluminum oxide, the fluorescent member 10 preferably contains a fluorescent material made of an oxide containing Al. Accordingly, the fluorescent member 10 and the light-reflective member 20 contain similar materials, and the coupling strength between these members can be thus increased. Examples of the fluorescent material made of an oxide containing Al include YAG-based fluorescent materials.

The fluorescent member 10 may be constituted of a fluorescent material alone or may be constituted of a fluorescent material and other members. Examples of the other members include a sintering agent. In this case, the sintering agent preferably contains the same material as the material contained in the light-reflective member 20. This constitution can further increase the coupling strength between the fluorescent member 10 and the light-reflective member 20.

Providing Light-Reflective Member 20

Subsequently, the powdered light-reflective member 20 is provided. The light-reflective member 20 can contain additive materials. In the case where an additive material is contained, the material to be used preferably has a refractive index higher than the refractive index of a base material, which is the major component (such as aluminum oxide), of the light-reflective member. This constitution can increase the light reflectance of the light-reflective member 20 (i.e., light reflectance for at least one of fluorescence from the fluorescent member and light from a light-emitting element) and can keep the light transmissivity low. Examples of the material having a high refractive index include boron nitride, yttrium oxide, lutetium oxide, zirconium oxide, and lanthanum oxide. These materials are however, poorly sinterable, thus a mechanical strength of the light-reflective member 20 may be decreased. In this case, a glass material (such as a glass material that contains boron oxide) having a melting point lower than the melting point of the base material can be further used for an additive material. The glass material changes into a liquid phase and enters the gap between the base material and additive materials other than the glass material of the light-reflective member 20, thereby strengthening the coupling between these materials. In the case where a glass material having a low melting point is used for an additive material, the quantity of the glass material added is equal to or less than 2% by mass of the whole light-reflective member 20. The term "sintered body" is used herein even if the content of a glass material in whole light-reflective member is equal to or less than 2% by mass.

Disposing Light-Reflective Member 20

Subsequently, the powdered light-reflective member 20 is disposed between a plurality of projections of the fluorescent member 10. Employing the powdered light-reflective member 20 facilitates filling the light-reflective member 20 between adjacent projections and substantially eliminates the gap between the fluorescent member 10 and the light-reflective member 20. In the present embodiment, the fluorescent member 10 is disposed with the projections facing up, and the powdered light-reflective member 20 is disposed from above, so that the light-reflective member 20 is disposed between the projections of the fluorescent member 10, as shown in FIG. 3F.

Figure 3F:
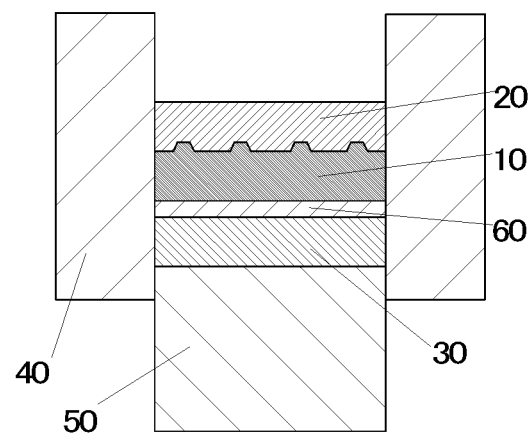
FIG. 3F is a schematic cross-sectional view for illustrating the method of manufacturing the fluorescent-material-containing member according to the first embodiment.

Although the sintered fluorescent member 10 is disposed on the lower side and the powdered light-reflective member 20 is disposed on the upper side in FIG. 3F, the order of disposition can be reversed. In other words, the powdered light-reflective member 20 is first disposed in the container, and the sintered fluorescent member 10 is then disposed with the projections facing down on the powdered light-reflective member 20. Then the sintered fluorescent member 10 can be pressed as appropriate. The light-reflective member 20 can be disposed between the plurality of projections of the fluorescent member 10 also in this manner.

Obtaining Sintered Body

Figure 3G:
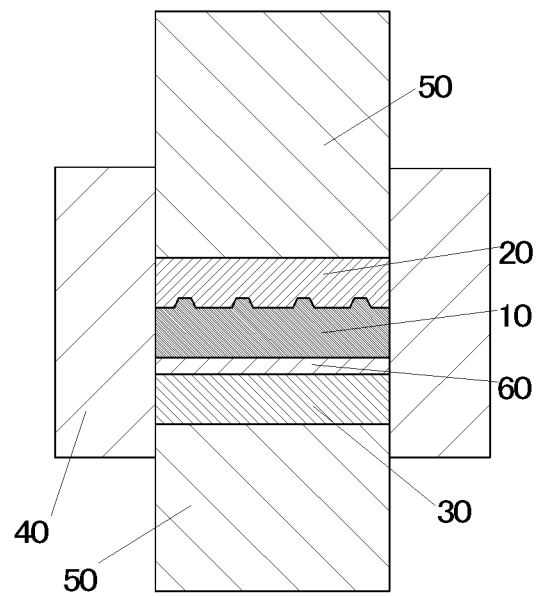
FIG. 3G is a schematic cross-sectional view for illustrating the method of manufacturing the fluorescent-material-containing member according to the first embodiment.

Subsequently, as shown in FIG. 3G, the powdered light-reflective member 20 is sintered to provide the sintered body in which the fluorescent member 10 and the light-reflective member 20 are integrally formed. Commonly, a sintered body is a solid mass formed by heating a powdered material at a temperature under its melting point. However, even in the case of the present embodiment where the fluorescent member 10 that has already been sintered and the powdered light-reflective member 20 that has not yet been sintered are heat-treated, a similar phenomenon is considered to occur between the surface of the sintered fluorescent member 10 and the surface of the powdered light-reflective member 20. Thus, a solid in which the sintered fluorescent member 10 and the powdered light-reflective member 20 are integrally formed is also referred to as a sintered body in the present embodiment.

The fluorescent member 10 and the light-reflective member 20 are preferably sintered under pressure. This constitution can improve the coupling strength between the fluorescent member 10 and the light-reflective member 20. The sintering method can be, for example, spark plasma sintering (SPS) or hot pressing (HP) sintering. SPS is preferably used. SPS is a method in which pulsed electric current generates heat under pressure applied by the upper and lower punches 50. SPS can quickly increase temperature in a comparatively short time using pulsed electric current, thereby facilitates control of grain growth in the light-reflective member 20. In the case where sintering is performed under pressure, for example, the pressure can be set to be in the range of equal to or more than 10 MPa and equal to or less than 50 MPa. Setting the lower limit as described above can increase the coupling strength between the fluorescent member 10 and the light-reflective member 20. Setting the upper limit as above facilitates control of grain growth in the light-reflective member 20 and facilitates alleviation of increase in grain diameter in the light-reflective member 20 (i.e., impairing of light reflectivity due to increased transmissivity).

In the present embodiment, the powdered fluorescent member and the powdered light-reflective member are not sintered in one step. The sintered fluorescent member 10 is provided in advance, and the powdered light-reflective member disposed between the projections of the fluorescent member 10 is then sintered. The same material (herein, aluminum oxide) as for the sintering agent is used for at least part of the light-reflective member, and the sintering temperature in sintering the powdered light-reflective member 20 is set to be lower than the sintering temperature in sintering the fluorescent member 10 (i.e., sintering temperature in sintering a mixture of the powdered fluorescent material and the powdered sintering agent). The following describes the reasons.

The fluorescent member 10 is required to be such that light is easily extracted, and its transmissivity (transmissivity for at least one of fluorescence from the fluorescent member 10 and light from the light-emitting element) is thus required to be equal to or more than a certain level. For example, the transmissivity of the fluorescent member can be increased by performing sintering at a high temperature to promote grain growth of the sintering agent contained in the fluorescent member 10. On the other hand, the light-reflective member 20 is required to easily reflect light, and its reflectance is thus required to be equal to or more than a certain level. For example, the reflectance of the light-reflective member 20 can be increased by sintering the light-reflective member 20 at a rather low temperature to discourage grain growth in the light-reflective member 20. For these reasons, in the case where the powdered fluorescent member 10 and the powdered light-reflective member 20 are sintered in one step, sintering at a high temperature in order to increase the transmissivity of the fluorescent member 10 decreases the reflectance of the light-reflective member 20. On the other hand, sintering at a low temperature in order to increase the reflectance of the light-reflective member 20 decreases the transmissivity of the fluorescent member 10. In view of the above, the sintered fluorescent member 10 is first obtained by sintering the powdered fluorescent material and the powdered sintering agent at a high temperature in the present embodiment. The powdered light-reflective member 20 disposed between the projections of the fluorescent member 10 is then sintered at a low temperature. In other words, the fluorescent member 10 can be sintered at a high temperature without regard for decrease in the reflectance of the light-reflective member 20, and the light-reflective member 20 can be sintered at a low temperature while maintaining the transmissivity of the fluorescent member 10. This constitution can achieve both improvement in the transmissivity of the fluorescent member 10 and improvement in the reflectance of the light-reflective member 20.

The powdered light-reflective member 20 can be sintered at a temperature in the range of equal to or more than 1100° C. and equal to or less than 1400° C. In the case where the sintered fluorescent member 10 is used, sintering is preferably performed at a temperature in the range of equal to or more than 1100° C. and equal to or less than 1200° C., more preferably in the range of equal to or more than 1130° C. and equal to or less than 1170° C., in obtaining the sintered body (i.e., sintering the powdered light-reflective member 20). Setting the lower limit as described above can increase the mechanical strength of the light-reflective member 20. Setting the upper limit as above can reduce decrease in the reflectance due to excessive grain growth in the light-reflective member 20.

In the present embodiment, the sintered body is heat-treated in an oxidizing atmosphere such as the air atmosphere after obtaining the sintered body. Commonly, a sintering mold used in SPS method or HP method contains carbon. In the case where the light-reflective member 20 contains some oxide, carbon in the sintering mold may cause carburizing or reduction reactions of the oxide contained in the light-reflective member 20, thereby the reflectance of the light-reflective member 20 may be decreased. Accordingly, the sintered body is heat-treated in an oxidizing atmosphere to facilitate removal of carbon contained in the oxide and enable bringing the lost oxygen back, thereby increasing the reflectance of the light-reflective member 20.

In heat-treating, the heat treatment can be performed at a temperature in the range of equal to or more than 1000° C. and equal to or less than 1500° C. In the case where the sintered fluorescent member 10 is used, the heat treatment is preferably performed at a temperature in the range of equal to or more than 1000° C. and equal to or less than 1200° C., more preferably in the range of equal to or more than 1050° C. and equal to or less than 1150° C. Setting the lower limit as described above facilitates bringing oxygen back to the oxide contained in the light-reflective member 20. Setting the upper limit as above can reduce decrease in the reflectance of the light-reflective member 20.

Removing Part of Sintered Body

Subsequently, part of the sintered body is removed from at least one of the first main surface side and the second main surface side of the fluorescent member 10 to obtain the fluorescent-material-containing member so that the fluorescent-material-containing member has a surface of the first main surface side that includes the fluorescent member 10 and the light-reflective member 20, and a surface of the second main surface side that includes the fluorescent member 10 and the light-reflective member 20 or is solely the fluorescent member 10.

Figure 3H:
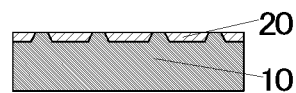
FIG. 3H is a schematic cross-sectional view for illustrating the method of manufacturing the fluorescent-material-containing member according to the first embodiment.
Figure 3I:
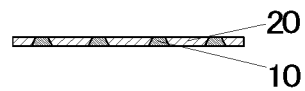
FIG. 3I is a schematic cross-sectional view for illustrating the method of manufacturing the fluorescent-material-containing member according to the first embodiment.
Figure 3J:
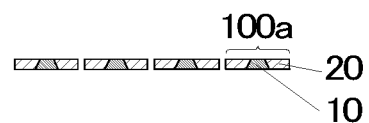
FIG. 3J is a schematic cross-sectional view for illustrating the method of manufacturing the fluorescent-material-containing member according to the first embodiment.

In the present embodiment, the sintered body obtained in FIG. 3G has the surface of the first main surface side including only the light-reflective member 20, and the surface of the second main surface side including only the fluorescent member 10. In other words, the tops of the projections of the fluorescent member 10 are buried in the light-reflective member 20. In this case, the fluorescent member 10 and the light-reflective member 20 are exposed as shown in FIG. 3H by removing part of the sintered body from the first main surface side of the sintered body to at least the tops of the projections of the fluorescent member 10. The fluorescent-material-containing member in which the surface of the first main surface side includes both the fluorescent member 10 and the light-reflective member 20 can be thus produced. In the present embodiment, another part of the sintered body is also removed from the second main surface side of the sintered body to the bottoms of the projections of the fluorescent member 10 as shown in FIG. 3I. The fluorescent-material-containing member 100 in which the surfaces of the first main surface side and the second main surface side each include both the fluorescent member 10 and the light-reflective member 20 can be thus obtained.

Figure 5:
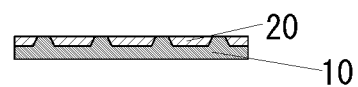
FIG. 5 is a schematic cross-sectional view for illustrating another embodiment of removing part of a sintered body.

Part of the sintered body may be removed from the second main surface side of the fluorescent member 10 so that the part to be removed dose not reach the bottoms of the projections of the fluorescent member 10, as shown in FIG. 5. In other words, part of the sintered body may be removed so that the surface of the second main surface side is made of only the fluorescent member 10. The fluorescent-material-containing member in which the light-reflective member 20 is disposed around the fluorescent member 10 as viewed from the first main surface side and only the fluorescent member 10 is present as viewed from the second main surface side can be thus produced. Such a fluorescent-material-containing member is disposed, for example, on or above the upper side of a light-emitting element 70, so that the upper surface of the light-emitting element 70 faces the second main surface of the fluorescent-material-containing member. With this constitution, light from the light-emitting element 70 can enter the second main surface side of the fluorescent member 10 and can be extracted from the first main surface side, which has an area smaller than the area of the second main surface. Increase in the luminance of the light-emitting device is thus facilitated.

In the present embodiment, the tops of the projections of the fluorescent member 10 are buried in the light-reflective member 20 in the sintered body obtained in the FIG. 3G. The light-reflective member, however, can be disposed only between the projections as shown in FIG. 3H in disposing the light-reflective member to provide the sintered body including the light-reflective member positioned only between the projections in obtaining the sintered body. In other words, the sintered body in which the first surface arranged on the first main surface side includes both the fluorescent member and the light-reflective member can be also obtained. In this case, part of the sintered body is removed so that removal is performed without reaching the bottoms of the projections in the case where part of the sintered body is removed from the first main surface side. In the case where part of the sintered body is removed from the second main surface side, part of the sintered body may be removed to the bottoms of the projections, or part of the sintered body may be removed so that removal is performed without reaching the bottoms of the projections.

In providing the fluorescent member 10, it is preferable that the first main surface be substantially parallel to the second main surface in the case where the sintered fluorescent member 10 is used. Part of the sintered body is preferably removed from the light-reflective member 20 side (i.e., upper side in FIG. 3H) with the second main surface of the fluorescent member 10 being the installation surface. This constitution enables the entire fluorescent member 10 to be exposed if the removal is performed parallel to the lower surface of the sintered body, and the removal can be easily performed.

Figure 6:
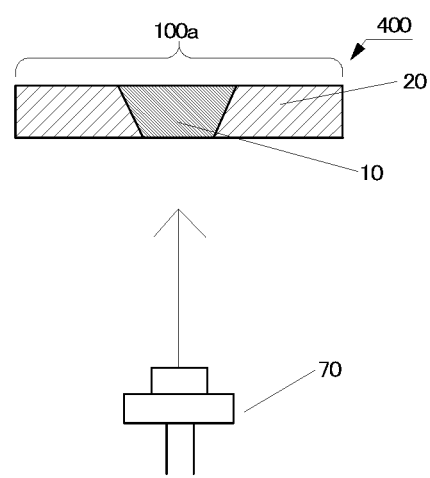
FIG. 6 is a schematic view of a light-emitting device in which the fluorescent-material-containing member according to the first embodiment after being singulated is combined with a light-emitting element.

For example, grinding or chemical mechanical polishing (CMP) can be used for a method of removing part of the sintered body. In the case where part of the sintered body is removed from an upper side and a lower side of, the roughnesses of the surfaces after the removal are preferably different from each other. For example, it is preferable that one of the upper surface and the lower surface of the fluorescent-material-containing member 100 be a rough surface and the other be a substantially specular surface. In the case where the fluorescent-material-containing member is combined with the light-emitting element 70 to constitute a light-emitting device, it is preferable that the specular surface side be the incident surface for light from the light-emitting element 70 and that the rough surface side be the light extracting surface of the light-emitting device as shown in FIG. 6. This constitution can reduce total reflection of light traveling from the fluorescent member 10 toward the outside while reducing light returning from the fluorescent member 10 to the light-emitting element 70, thereby alleviating decrease in the light extraction efficiency of the light-emitting device.

Singulating

As shown in FIG. 3J, the sintered body can be singulated after removing part of the sintered body so that each piece includes at least one fluorescent member 10 surrounded by the light-reflective member 20 as viewed from the first main surface side. Fluorescent-material-containing members 100a each having a desired size and including the light-reflective member 20 around the fluorescent member 10 can be thus obtained. The sintered body can be singulated, for example, by scribing, dicing, or breaking. The operation can be efficiently performed by singulating the sintered body after exposing the fluorescent member 10, but the sintered body may be singulated before exposing the fluorescent member 10.

Other Constitutions

The fluorescent-material-containing member 100 can be combined with the light-emitting element 70 to constitute a light-emitting device. In FIG. 6, a laser diode (LD) is used for the light-emitting element 70, and the LD is combined with the singulated fluorescent-material-containing member 100a to constitute a light-emitting device 400. In the case where an LD is used, in view of ease of dissipation of heat generated from the LD and the fluorescent member 10, the LD is preferably separated from the fluorescent member 10 as shown in FIG. 6. For example, the LD can be separated from the fluorescent member 10 via an optical fiber. The fluorescent-material-containing member 100 can be mounted on the upper surface of a light reflector so that light from the LD incident on the fluorescent member 10 is reflected by the light reflector.

Second Embodiment

Figure 7:
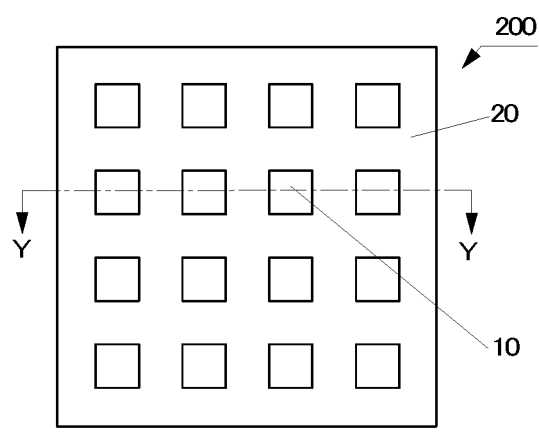
FIG. 7 is a schematic top view of a fluorescent-material-containing member according to a second embodiment.
Figure 8:
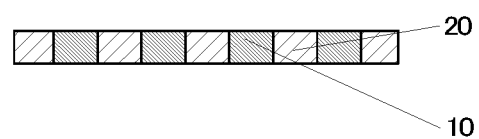
FIG. 8 is a schematic cross-sectional view taken along the line Y-Y in FIG. 7.

FIG. 7 is a schematic top view of a fluorescent-material-containing member 200 obtained by a manufacturing method according to the present embodiment. FIG. 8 is a schematic cross-sectional view taken along the line Y-Y in FIG. 7. FIG. 9A to FIG. 9H illustrate the method of manufacturing the fluorescent-material-containing member 200.

Figure 9A:
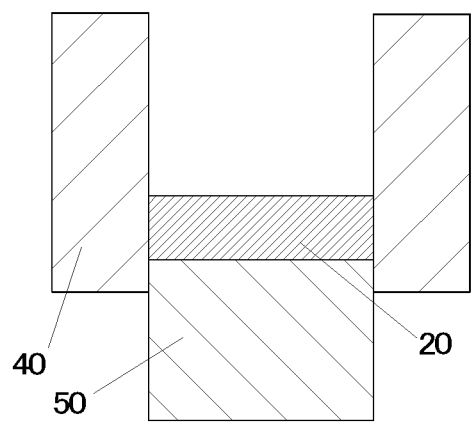
FIG. 9A is a schematic cross-sectional view for illustrating a method of manufacturing the fluorescent-material-containing member according to the second embodiment.
Figure 9B:
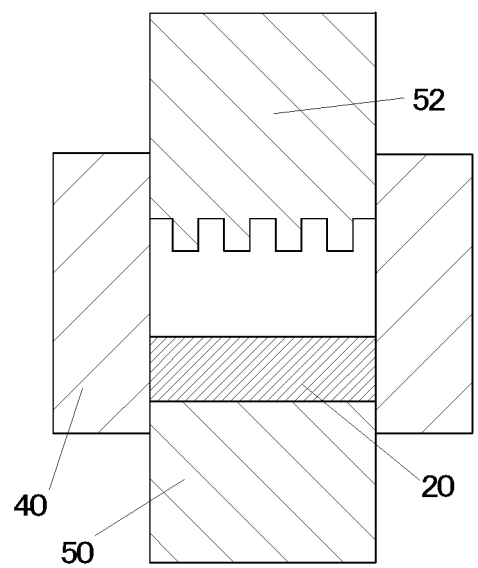
FIG. 9B is a schematic cross-sectional view for illustrating the method of manufacturing the fluorescent-material-containing member according to the second embodiment.
Figure 9C:
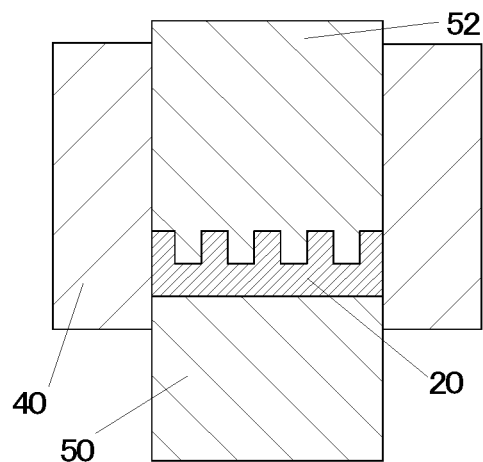
FIG. 9C is a schematic cross-sectional view for illustrating the method of manufacturing the fluorescent-material-containing member according to the second embodiment.
Figure 9D:
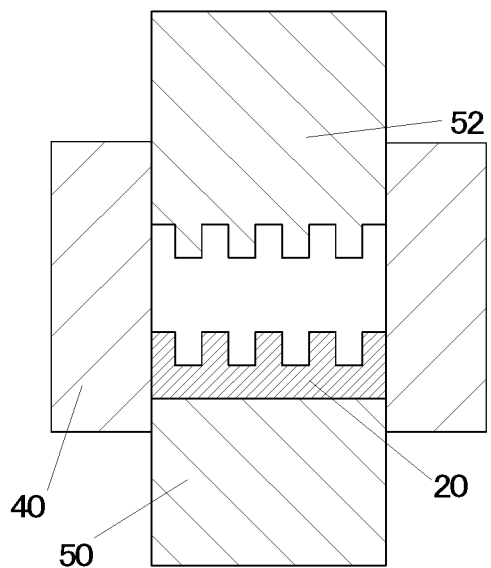
FIG. 9D is a schematic cross-sectional view for illustrating the method of manufacturing the fluorescent-material-containing member according to the second embodiment.
Figure 9E:
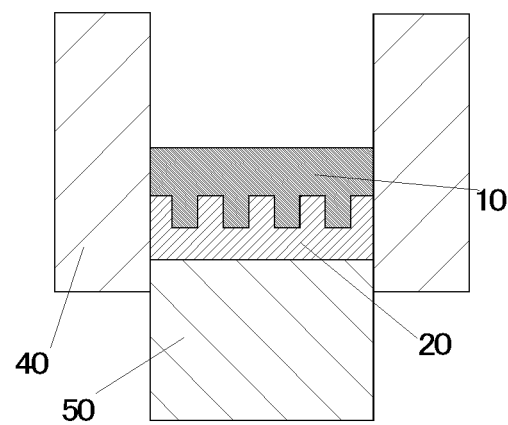
FIG. 9E is a schematic cross-sectional view for illustrating the method of manufacturing the fluorescent-material-containing member according to the second embodiment.
Figure 9F:
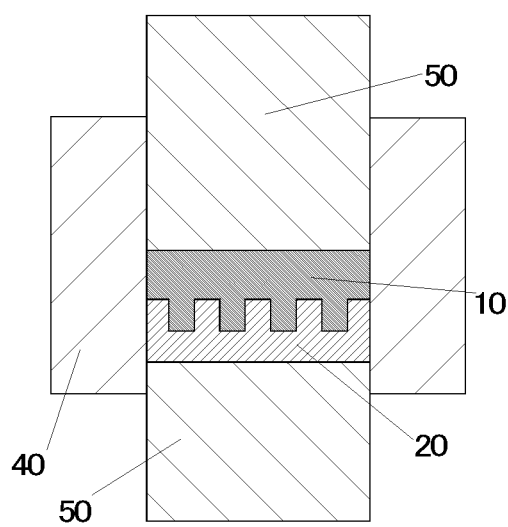
FIG. 9F is a schematic cross-sectional view for illustrating the method of manufacturing the fluorescent-material-containing member according to the second embodiment.
Figure 9G:
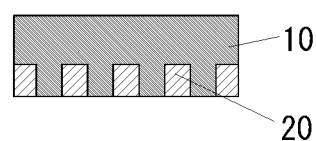
FIG. 9G is a schematic cross-sectional view for illustrating the method of manufacturing the Fluorescent-material-containing member according to the second embodiment.

The method of manufacturing the fluorescent-material-containing member 200 includes: providing a light-reflective member 20 having a first main surface side including a plurality of depressions and a second main surface side opposite to the first main surface side (FIG. 9A to FIG. 9D); disposing a powder of a fluorescent member 10 containing a fluorescent material in the plurality of depressions of the light-reflective member 20 (FIG. 9E); obtaining a sintered body by sintering the powder of the fluorescent member 10 so that the sintered body including the light-reflective member 20 integrally formed with the fluorescent member 10 (FIG. 9F); and removing part of the sintered body from at least the second main surface side of the light-reflective member 20 to obtain the fluorescent-material-containing member 200, so that the fluorescent-material-containing member including a second surface arranged on the second main surface side and defined by the fluorescent member 10 and the light-reflective member 20, and a first surface arranged on the first main surface side and defined by the fluorescent member 10 and the light-reflective member 20 or defined solely by the fluorescent member 10 (FIG. 9G).

The present embodiment can have effects similar to the effects of the first embodiment. The method of manufacturing the fluorescent-material-containing member 200 is substantially the same as the method described in the first embodiment except for the points described below.

First, the light-reflective member 20 having a plurality of depressions on the first main surface is provided. In the present embodiment, providing the light-reflective member 20 includes filling a container serving as a sintering mold with a powder of a light-reflective member 20 (FIG. 9A), and producing the light-reflective member 20 constituting the plurality of depressions formed by pressing the powder of the light-reflective member 20 with a pressing member 52 that has a plurality of projections to form the depressions of the light-reflective member 20 (FIG. 9B to FIG. 9D). Thus, the light-reflective member 20 that maintains a certain shape (i.e., shape having a plurality of depressions) while being in a powdered state can be formed by a comparatively simple method. In this step, a sintered light-reflective member 20 may be provided.

In the present embodiment, the shape of the openings of the depressions is a quadrilateral in a top view. The size of the depressions can be changed as appropriate depending on the light-emitting element 70 to be combined. For example, the bottom of each depression preferably has a side length in the range of equal to or more than 0.1 mm and equal to or less than 3 mm, more preferably equal to or more than 0.5 mm and equal to or less than 2 mm, in the case where an LED chip is used for the light-emitting element 70. Setting the lower limit as described above facilitates filling of the depressions with the fluorescent member 10. Setting the upper limit as above can increase the number of pieces of the fluorescent member 10 included in the fluorescent-material-containing member before being singulated.

Subsequently, the powdered fluorescent member 10 containing a fluorescent material is provided. The powdered fluorescent member 10 is then disposed in the plurality of depressions of the light-reflective member 20 (FIG. 9E). In other words, the powdered fluorescent member 10 is disposed on the powdered light-reflective member 20 in the present embodiment. In the case where the sintered light-reflective member 20 is provided, the order of disposition of the light-reflective member 20 and the fluorescent member 10 can be appropriately determined other than the order as described above. In other words, the sintered light-reflective member 20 may be disposed on the lower side and the powdered fluorescent member 10 may be disposed on the upper side, or the order of disposition can be reversed.

In the present embodiment, both the powdered fluorescent member 10 and the powdered light-reflective member 20 are sintered in one step to provide the sintered body in which the fluorescent member 10 and the light-reflective member 20 are integrally formed. In this case, the transmissivity of the sintering agent contained in the fluorescent member 10 is required to be high. Thus, the sintering temperature is higher than the sintering temperature in the first embodiment. For example, sintering is performed preferably at a temperature in the range of equal to or more than 1100° C. and equal to or less than 1400° C., more preferably in the range of equal to or more than 1200° C. and equal to or less than 1350° C. Setting the lower limit as described above can increase the transmissivity of the sintering agent. Setting the upper limit as above can alleviate decrease in the reflectance of the light-reflective member 20 to some extent.

In heat-treating, the heat treatment can be performed at a temperature in the range of equal to or more than 1200° C. and equal to or less than 1500° C. In the case where the transmissivity of the sintering agent is attempted to be increased, the heat treatment is performed preferably at a temperature in the range of equal to or more than 1350° C. and equal to or less than 1450° C. In the case where enhancement of the reflectance of the light-reflective member 20 is prioritized, the heat treatment is performed preferably in the range described in the first embodiment.

In the present embodiment, the buffering member 30 may be disposed interposing the mold release sheet 60 after disposing the fluorescent member 10. In this case, it is preferable that the buffering member 30 has the same thickness as the light-reflective member 20.

Figure 9H:
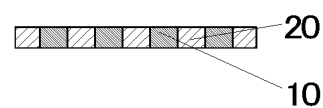
FIG. 9H is a schematic cross-sectional view for illustrating the method of manufacturing the fluorescent-material-containing member according to the second embodiment.

In the present embodiment, part of the sintered body is removed so that the surface on the first main surface side of the light-reflective member 20 includes the fluorescent member 10 and the light-reflective member 20 as shown in FIG. 9H. This constitution is not limiting, and part of the sintered body may be removed from the first main surface side of the light-reflective member 20 so that the light-reflective member 20 does not be exposed. In other words, part of the sintered body may be removed so that the surface of the first main surface side after removal from the first main surface side is made of only the fluorescent member 10. In the case where the fluorescent-material-containing member having the surface of the first main surface side made of only the fluorescent member 10 is to be singulated, the sintered body is singulated so that each piece includes at least one fluorescent member 10 surrounded by the light-reflective member 20 as viewed from the second main surface side.

Other Constitutions

Figure 10:
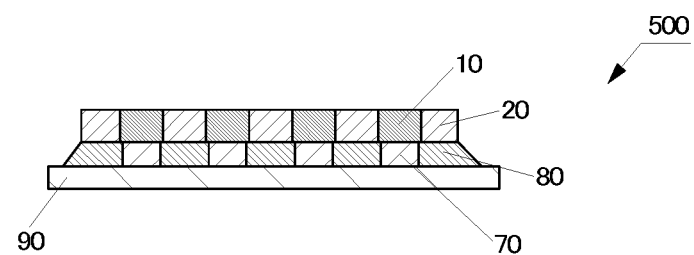
FIG. 10 is a schematic cross-sectional view of a light-emitting device in which the fluorescent-material-containing member according to the second embodiment is combined with light-emitting elements.

In the present embodiment, an LED chip is used as the light-emitting element 70, and a plurality of LED chips mounted on the upper surface of a base substrate 90 is combined with the fluorescent-material-containing member 200 to constitute a light-emitting device 500 (FIG. 10). In this case, the fluorescent-material-containing member 200 is preferably disposed so that light from one LED chip enters one fluorescent member 10. The method of disposing the fluorescent-material-containing member 200 on the upper surfaces of the LED chips is preferably surface-activated bonding or atomic diffusion bonding, more preferably surface-activated bonding. By surface-activated bonding, no other member interposing between the LED chip and the fluorescent member 10, and light absorption by the other members is less likely to occur. In gaps between adjacent LED chips, light is preferably blocked by light-shielding member 80 or the like. This constitution can allow only the fluorescent members 10 disposed on lighted LED chips to emit light.

Third Embodiment

FIG. 11A to FIG. 11G illustrate a method of manufacturing a fluorescent-material-containing member 300 according to the present embodiment. The method of manufacturing the fluorescent-material-containing member 300 is substantially the same as the method described in the second embodiment except for the points described below.

Figure 11A:
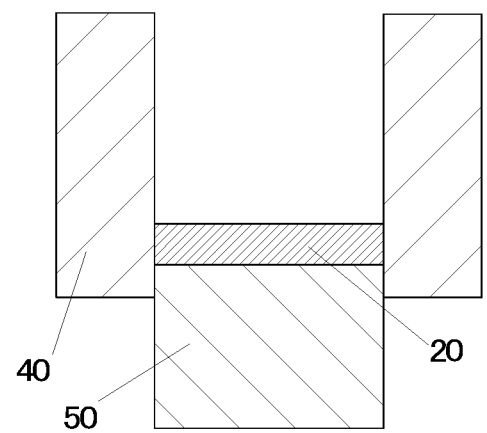
FIG. 11A is a schematic cross-sectional view for illustrating a method of manufacturing a fluorescent-material-containing member according to a third embodiment.
Figure 11B:
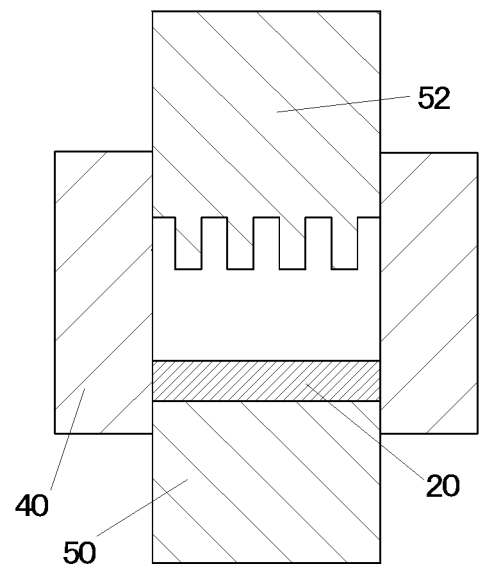
FIG. 11B is a schematic cross-sectional view for illustrating the method of manufacturing the fluorescent-material-containing member according to the third embodiment.
Figure 11C:
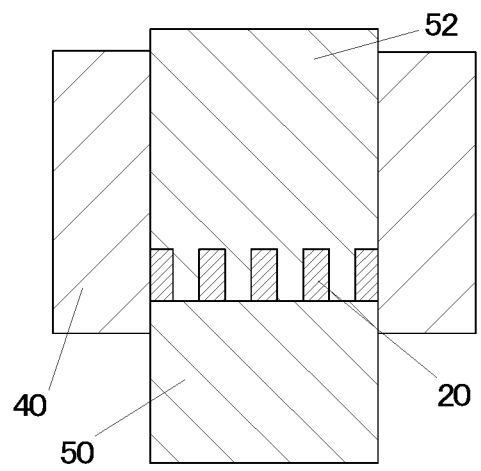
FIG. 11C is a schematic cross-sectional view for illustrating the method of manufacturing the fluorescent-material-containing member according to the third embodiment.
Figure 11D:
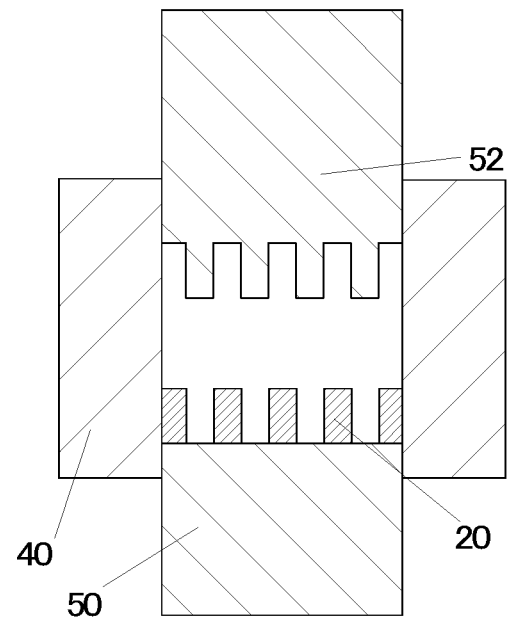
FIG. 11D is a schematic cross-sectional view for illustrating the method of manufacturing the fluorescent-material-containing member according to the third embodiment.
Figure 11E:
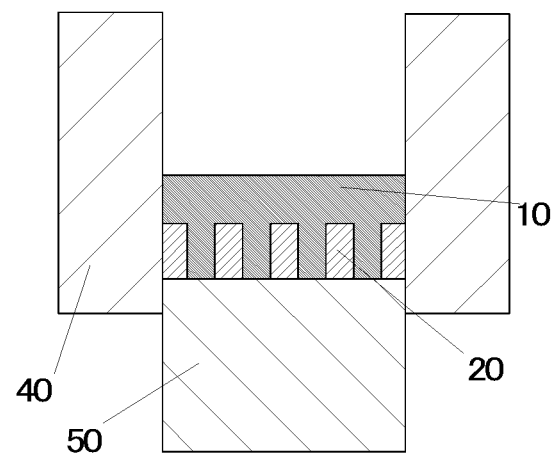
FIG. 11E is a schematic cross-sectional view for illustrating the method of manufacturing the fluorescent-material-containing member according to the third embodiment.
Figure 11F:
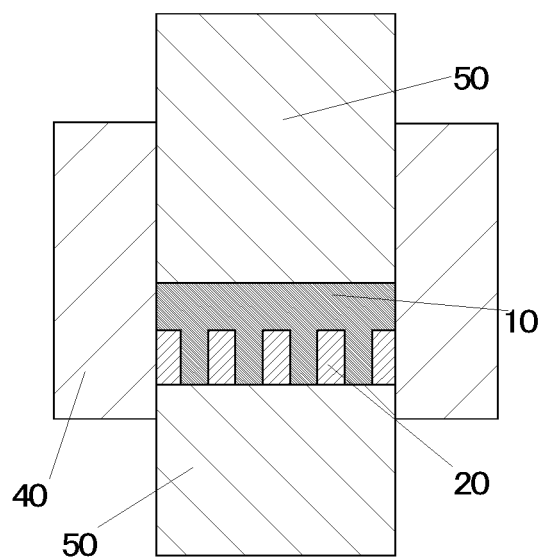
FIG. 11F is a schematic cross-sectional view for illustrating the method of manufacturing the fluorescent-material-containing member according to the third embodiment.
Figure 11G:
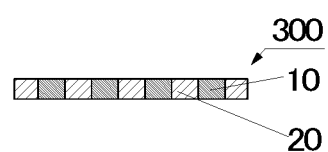
FIG. 11G is a schematic cross-sectional view for illustrating the method of manufacturing the fluorescent-material-containing member according to the third embodiment.

In the present embodiment, the light-reflective member 20 having a plurality of through holes penetrating through a first main surface and a second main surface positioned on an opposite side from the first main surface is provided in providing the light-reflective member 20 (FIG. 11A to FIG. 11D). A powder of a fluorescent member 10 including a fluorescent material is then disposed in the plurality of through holes (FIG. 11E). The powder of the fluorescent member 10 is sintered to provide the sintered body in which the light-reflective member 20 is integrally formed with the fluorescent member 10 (FIG. 11F). Part of the sintered body is removed from at least one of the first main surface side and the second main surface side of the fluorescent member 10 to provide a fluorescent-material-containing member including a first surface arranged on the first main surface side and defined by the fluorescent member 10 and the light-reflective member 20, and a second surface arranged on the second main surface side and defined by the fluorescent member 10 and the light-reflective member 20 or defined solely by the fluorescent member 10 (FIG. 11G). When the sintered light-reflective member 20 is provided in providing the light-reflective member 20, the fluorescent member 10 may be disposed in the through holes by disposing the powdered fluorescent member 10 in a container and pressing the sintered light-reflective member 20.

The present embodiment can have effects similar to the effects of the second embodiment.

In the present embodiment, the sintered body that has the upper surface including only the fluorescent member 10 and the lower surface including both the fluorescent member 10 and the light-reflective member 20 is obtained in obtaining the sintered body. In the case where part of the sintered body is removed from the lower side in this case, part of the sintered body is removed so that removal is performed without reaching at least the upper surface of the light-reflective member 20. In the case where part of the sintered body is removed from the upper side, part of the sintered body may be removed so that the light-reflective member 20 is exposed as shown in FIG. 11G, or part of the sintered body may be removed so that the light-reflective member 20 does not be exposed.

Figure 12:
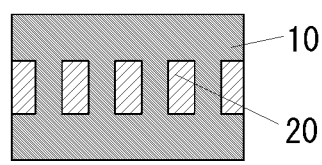
FIG. 12 is a schematic cross-sectional view for illustrating another embodiment of removing part of a sintered body of the third embodiment.

In the case where the fluorescent member covers the upper surface and the lower surface of the light-reflective member in disposing the fluorescent member, a sintered body in which the upper surface and the lower surface of the light-reflective member are covered with the fluorescent member is obtained in obtaining the sintered body as shown in FIG. 12. In this case, part of the sintered body is removed from one of the upper side and the lower side so that the surface on one of the upper side and the lower side includes the fluorescent member and the light-reflective member. In this case, another part of the sintered body may be further removed from the other one of the upper side and the lower side. In the case where part of the sintered body is removed from the other one of the upper side and the lower side, part of the sintered body may be removed so that the surface after removal includes the fluorescent member and the light-reflective member, or part of the sintered body may be removed so that the surface after removal includes only the fluorescent member.

The following describes a fluorescent-material-containing member of each example.

Example 1

A plate-shaped sintered fluorescent member 10 containing $Y_3Al_5O_{12}$:Ce and aluminum oxide was first provided as the fluorescent member 10 as shown in FIG. 3C. A plurality of projections were then formed on the upper surface of the plate-shaped sintered fluorescent member 10 (hereinafter referred to as a "YAG plate") using a dicing device as shown in FIG. 3D. Although the shape of the projections is a circle in a top view in FIG. 3D, the shape was a square with a side length of 1 mm in the present example. The distance between one projection and an adjacent projection was 1 mm.

Subsequently, a sintering mold was filled with a buffering member 30 containing powdered aluminum oxide, and a carbon sheet was disposed as shown in FIG. 3A and FIG. 3B. The YAG plate 10 was then disposed with the side having the projections facing up as shown in FIG. 3E.

Subsequently, the sintering mold was filled with a powdered light-reflective member 20 containing aluminum oxide as shown in FIG. 3F. At this time, the buffering member 30 had the same thickness as the light-reflective member 20. The light-reflective member 20 was then sintered by SPS under a pressure of 30 MPa at 1100° C. as shown in FIG. 3G, and a sintered body in which fluorescent member 10 and the light-reflective member 20 were integrally formed was obtained.

Subsequently, the sintered body was removed from the sintering mold and released from the mold in the position in which the carbon sheet was disposed. The resulting sintered body was then heat-treated in the air atmosphere at 1100° C.

Subsequently, part of the resulting sintered body was removed from an upper side and a lower side of the sintered body to expose the fluorescent member 10 and the light-reflective member 20 on the surface after removal as shown in FIG. 3H and FIG. 3I.

Example 2

Example 2 was substantially the same as Example 1 except that sintering was performed at 1200° C.

Example 3

Example 3 was substantially the same as Example 1 except that sintering was performed at 1150° C. and that heat treatment was performed at 1000° C.

Example 4

Example 4 was substantially the same as Example 3 except for the points described below. A plate-shaped sintered fluorescent member 10 was first provided as shown in FIG. 3C, and a plurality of projections were formed on the upper surface of the plate-shaped sintered fluorescent member 10 with a machining center as shown in FIG. 3D. The shape of the projections was a circle in a top view, and the side surfaces were inclined so that the projections became smaller in inner diameter from the lower side toward the upper side. The inner diameter of a tops of the individual projections was each 0.3 mm, and the inner diameter of the bottoms of the individual projections was each 0.5 mm. The shortest distance between the bottom of one projection and the bottom of an adjacent projection was 5 mm. The temperature in the heat treatment was 1100° C.

Example 5

Example 5 was substantially the same as Example 3 except that 80% by mass of aluminum oxide and 20% by mass of boron nitride were used for the light-reflective member 20 and that the temperature in heat treatment was 1100° C.

Example 6

A sintering mold was first filled with a buffering member 30 containing powdered aluminum oxide as shown in FIG. 3A, and a carbon sheet was disposed as shown in FIG. 3B.

Subsequently, a powdered fluorescent member 10 containing $Y_3Al_5O_{12}$:Ce and aluminum oxide was filled as shown in FIG. 4A. The powdered fluorescent member 10 was then pressed with a pressing member 51 having a plurality of depressions to produce the fluorescent member 10 with a plurality of projections as shown in FIG. 4B to FIG. 4D. The projections had a square shape with a side length of 1 mm in a top view. The distance between one projection and an adjacent projection was 1 mm.

Subsequently, the sintering mold was filled with a powdered light-reflective member 20 containing aluminum oxide as shown in FIG. 3F. Although the sintered fluorescent member 10 is used in the description of the first embodiment in FIG. 3F, a fluorescent member 10 that maintained a certain shape (i.e., shape having a plurality of projections) while being in a powdered state was used in the present example. At this time, the buffering member 30 had the same thickness as the light-reflective member 20. Both the fluorescent member 10 and the light-reflective member 20 were then sintered by SPS under a pressure of 50 MPa at 1250° C. as shown in FIG. 3G, and a sintered body in which the fluorescent member 10 and the light-reflective member 20 were integrally formed was obtained.

Subsequently, the sintered body was removed from the sintering mold and released from the mold in the position in which the carbon sheet was disposed. The resulting sintered body was then heat-treated in the air atmosphere at 1400° C., and further heat-treated in the nitrogen atmosphere at 1400° C.

Subsequently, part of the resulting sintered body was removed from an upper side and a lower side of the sintered body to expose the fluorescent member 10 and the light-reflective member 20 of the surface after removal as shown in FIG. 3H and FIG. 3I.

Example 7

In Example 7, a sintering mold was first filled with a light-reflective member 20 containing aluminum oxide as shown in FIG. 9A. The light-reflective member 20 was then pressed with a pressing member 52 having a plurality of projections to produce the light-reflective member 20 with a plurality of depressions as shown in FIG. 9B to FIG. 9D. The depressions had a square shape with a side length of 1 mm in a top view. The distance between one depression and an adjacent depression was 1 mm.

Subsequently, a powdered fluorescent member 10 containing $Y_3Al_5O_{12}$:Ce and aluminum oxide was filled into the sintering mold as shown in FIG. 9E.

Subsequently, a carbon sheet was disposed on the upper surface of the fluorescent member 10. A buffering member 30 containing aluminum oxide was then disposed on the upper surface of the carbon sheet so that the buffering member 30 had substantially the same thickness as the light-reflective member 20. The fluorescent member 10 and the light-reflective member 20 were then sintered by SPS under a pressure of 50 MPa at 1250° C. as shown in FIG. 9F.

Subsequently, the sintered body was removed from the sintering mold and released from the mold in the position in which the carbon sheet was disposed. The resulting sintered body was then heat-treated in the air atmosphere at 1400° C., and further heat-treated in the nitrogen atmosphere at 1400° C.

Subsequently, part of the resulting sintered body was removed from an upper side and an lower side of the sintered body to expose the fluorescent member 10 and the light-reflective member 20 on the surface after removal as shown in FIG. 9G and FIG. 9H.

Example 8

Example 8 was substantially the same as Example 7 except that 80% by mass of aluminum oxide and 20% by mass of boron nitride were used for the light-reflective member 20.

Evaluation

In each example, a sufficient coupling strength between the fluorescent member 10 and the light-reflective member 20 was obtained. Table 1 shows the results of evaluation of sintered light-reflective members 20 formed under substantially the same conditions as the examples in three points of view of "mechanical strength", "light reflectance", and "light transmissivity". In Table 1, numbers assigned to samples each correspond to one of numbers assigned to examples (for example, Sample 1 corresponds to Example 1). The mechanical strength was evaluated on a scale of one to five from fragile to unbreakable (larger value is assigned for an unbreakable sample) through comparison of breakability at the time samples were broken by hand. The reflectance was evaluated on the basis of measurement results with a spectrocolorimeter. Specifically, a sample (light-reflective member 20) with a thickness of 5 mm was first disposed on a base. Subsequently, the surface of each sample was irradiated with light for measurement of 370 nm to 740 nm to measure reflectance from reflected light from the surface of each sample. The reflectance was evaluated on a scale of one to five from low to high reflectances (larger value is assigned for a sample with a high reflectance) through comparison of results of the reflectances of samples at 440 nm. The transmissivity was evaluated on the basis of measurement results with an illuminance meter. Specifically, the sample that had been used for the measurement of reflectance was first ground to a thickness of 1 mm, and the sample was disposed on a base. Subsequently, the sample was irradiated with light at 445 nm to measure light transmitted through the sample with the illuminance meter. The transmissivity was evaluated on a scale of one to five from high to low transmissivities (larger value is assigned for a sample with a low transmissivity) through comparison of results for the samples. The thickness of the sample was different between the measurement of reflectance and the measurement of transmissivity because the sample was required to be thick in order to reduce effects of the reflectance of the base in the measurement of reflectance, while a too large thickness of the sample made it difficult to compare the difference in the measurement of transmissivity.

TABLE

| Sample | Method | Light-reflective member | Sintering temperature | Temperature in heat treatment | Atmosphere | Mechanical strength High: 5 ↔ low: 1 | Light reflectance High: 5 ↔ low: 1 | Light Transmissivity Low: 5 ↔ high: 1 |
|---|---|---|---|---|---|---|---|---|
| 1 | Sintered fluorescent member/ powdered light-reflective member | $Al_2O_3$ (100% by mass) | 1100° C. | 1100° C. | Air | 3 | 4 | 4 |
| 2 | | | 1200° C. | 1100° C. | | 5 | 4 | 2 |
| 3 | | | 1150° C. | 1000° C. | | 4 | 4 | 4 |
| 4 | | | | 1100° C. | | 4 | 4 | 3 |
| 5 | | $Al_2O_3$ (80% by mass) BN (20% by mass) | 1150° C. | 1100° C. | | 3 | 5 | 4 |
| 6 | Powdered fluorescent member/ powdered light-reflective member | $Al_2O_3$ (100% by mass) | 1250° C. | 1400° C. | Air + nitrogen | 5 | 3 | 2 |
| 7 | | $Al_2O_3$ (100% by mass) | | | | 5 | 3 | 2 |
| 8 | | $Al_2O_3$ (80% by mass) BN (20% by mass) | | | | 4 | 4 | 3 |

As shown in Table 1, Sample 1 to Sample 5 had high reflectances, and Sample 1 and Samples 3 to 5 also had reduced transmissivities. These results are attributed to low sintering temperatures of the light-reflective members. Sample 2 had a high transmissivity despite a good result of its reflectance. It is considered that these results are attributed to decrease in light absorptance of the light-reflective member 20 in Sample 2 for some reason.

On the other hand, Sample 2 to Sample 4 and Sample 6 to Sample 8 also had high mechanical strengths. It is considered that these results are attributed to absence of poorly sinterable additive materials in the light-reflective members 20 and promotion of grain growth of the light-reflective members 20 by sintering at a temperature equal to or more than a certain level.

The fluorescent-material-containing member described in each embodiment can be used for vehicles and lighting apparatuses or other applications.

What is claimed is:

1. A method of manufacturing a fluorescent-material-containing member, the method comprising:
   providing a fluorescent member including a fluorescent material, the fluorescent member having a first main surface side including a plurality of projections and a second main surface side opposite to the first main surface side;
   disposing a powder of a light-reflective member between the projections of the fluorescent member;
   obtaining a sintered body by sintering the powder of the light-reflective member, the sintered body including the light-reflective member integrally formed with the fluorescent member; and
   removing part of the sintered body from at least one of the first main surface side and the second main surface side of the fluorescent member to obtain a fluorescent-material-containing member such that
   the fluorescent-material-containing member includes a first surface arranged on the first main surface side and defined by the fluorescent member and the light-reflective member, and a second surface arranged on the second main surface side and defined by the fluorescent member and the light-reflective member, or
   the fluorescent-material-containing member includes the first surface arranged on the first main surface side and defined by the fluorescent member and the light-reflective member, and the second surface arranged on the second main surface side and defined solely by the fluorescent member.

2. The method of manufacturing a fluorescent-material-containing member according to claim 1, wherein
   the removing of the part of the sintered body includes removing the part of the sintered body to obtain the second surface defined by the fluorescent member and the light-reflective member.

3. The method of manufacturing a fluorescent-material-containing member according to claim 2, wherein
   the obtaining of the sintered body includes performing spark plasma sintering or hot pressing sintering.

4. The method of manufacturing a fluorescent-material-containing member according to claim 1, wherein
   the fluorescent member includes the fluorescent material having an oxide containing aluminum, and
   the light-reflective member contains aluminum oxide.

5. The method of manufacturing a fluorescent-material-containing member according to claim 4, wherein
   the fluorescent member contains aluminum oxide as a sintering agent.

6. The method of manufacturing a fluorescent-material-containing member according to claim 5, wherein
   the providing of the fluorescent member includes sintering a mixture of a powder of the fluorescent material and a powder of the sintering agent to obtain the fluorescent member having the projections on the first main surface side, and
   a sintering temperature in the sintering of the powder of the light-reflective member is lower than a sintering temperature in the sintering of the mixture of the powder of the fluorescent material and the sintering agent.

7. The method of manufacturing a fluorescent-material-containing member according to claim 4, further comprising
   heat-treating the sintered body in an oxidizing atmosphere after the sintered body is obtained.

8. The method of manufacturing a fluorescent-material-containing member according to claim 1, wherein
   the providing of the fluorescent member includes:
   filling a container with a powder of the fluorescent member containing the fluorescent material, and
   pressing the powder of the fluorescent member with a pressing member having a plurality of depressions to form the projections of the fluorescent member, and
   the obtaining of the sintered body includes sintering the fluorescent member and the light-reflective member.

9. The method of manufacturing a fluorescent-material-containing member according to claim 8, wherein
   each of the depressions of the pressing member has an opening that becomes wider as being further away from a bottom surface of a corresponding one of the depressions.

10. The method of manufacturing a fluorescent-material-containing member according to claim 1, wherein
   the providing of the fluorescent member includes forming the projections on the fluorescent member that has been sintered.

11. The method of manufacturing a fluorescent-material-containing member according to claim 10, wherein
   the forming of the projections includes forming the projections with a machining center.

12. The method for manufacturing a fluorescent-material-containing member according to claim 10, wherein
   the fluorescent member includes the fluorescent material having an oxide containing aluminum, and
   the light-reflective member contains aluminum oxide.

13. The method of manufacturing a fluorescent-material-containing member according to claim 1, the method further comprising
   singulating the sintered body after the removing of the part of the sintered body so that at least one of the first surface and the second surface of the fluorescent-material-containing member obtained after the singulating of the sintered body includes the light-reflective member around the fluorescent member.

14. A method of manufacturing a fluorescent-material-containing member, the method comprising:
   providing a light-reflective member having a first main surface side including a plurality of depressions and a second main surface side opposite to the first main surface side;
   disposing a powder of a fluorescent member containing a fluorescent material in the depressions of the light-reflective member;
   obtaining a sintered body by sintering the powder of the fluorescent member, the sintered body including the light-reflective member integrally formed with the fluorescent member; and
   removing part of the sintered body from at least the second main surface side of the light-reflective member to obtain a fluorescent-material-containing member such that
      the fluorescent-material-containing member includes a second surface arranged on the second main surface side and defined by the fluorescent member and the light-reflective member, and a first surface arranged on the first main surface side and defined by the fluorescent member and the light-reflective member, or
      the fluorescent-material-containing member includes the second surface arranged on the second main surface side and defined by the fluorescent member and the light-reflective member, and the first surface arranged on the first main surface side and defined solely by the fluorescent member.

15. The method of manufacturing a fluorescent-material-containing member according to claim 14, wherein
   the removing of the part of the sintered body includes removing the part of the sintered body to obtain the first surface defined by the fluorescent member and the light-reflective member.

16. The method of manufacturing a fluorescent-material-containing member according to claim 15, wherein
   the providing of the light-reflective member includes:
      filling a container with a powder of the light-reflective member, and
      pressing the powder of the light-reflective member with a pressing member including a plurality of projections to form the depressions of the light-reflective member,
   the obtaining of the sintered body includes sintering the fluorescent member and the light-reflective member.

17. The method of manufacturing a fluorescent-material-containing member according to claim 16, wherein
   the obtaining of the sintered body includes performing spark plasma sintering or hot pressing sintering.

18. The method of manufacturing a fluorescent-material-containing member according to claim 14, wherein
   the fluorescent member includes the fluorescent material having an oxide containing aluminum, and
   the light-reflective member contains aluminum oxide.

19. The method of manufacturing a fluorescent-material-containing member according to claim 18, wherein
   the fluorescent member contains aluminum oxide as a sintering agent.

20. The method of manufacturing a fluorescent-material-containing member according to claim 18, further comprising
   heat-treating the sintered body in an oxidizing atmosphere after the sintered body is obtained.

21. The method of manufacturing a fluorescent-material-containing member according to claim 14, further comprising
   singulating the sintered body after the removing of the part of the sintered body so that at least one of the first surface and the second surface of the fluorescent-material-containing member obtained after the singulating of the sintered body includes the light-reflective member around the fluorescent member.

22. A method of manufacturing a fluorescent-material-containing member, the method comprising:
   providing a light-reflective member having a plurality of through holes penetrating through a first main surface and a second main surface positioned on an opposite side from the first main surface;
   disposing a powder of the fluorescent member including a fluorescent material in the through holes with the fluorescent member covering at least one of the first main surface and the second main surface;
   obtaining a sintered body by sintering the powder of the fluorescent member, the sintered body including the light-reflective member integrally formed with the fluorescent member; and
   removing part of the sintered body from at least one of a first main surface side and a second main surface side of the light-reflective member to obtain a fluorescent-material-containing member such that
      the fluorescent-material-containing member includes a first surface arranged on the first main surface side and defined by the fluorescent member and the light-reflective member, and a second surface arranged on the second main surface side and defined by the fluorescent member and the light-reflective member, or
      the fluorescent-material-containing member includes a first surface arranged on the first main surface side and defined by the fluorescent member and the light-reflective member, and a second surface arranged on the second main surface side and defined solely by the fluorescent member.

23. The method of manufacturing a fluorescent-material-containing member according to claim 22, wherein
the removing of the part of the sintered body includes removing the part of the sintered body to obtain the second surface defined by the fluorescent member and the light-reflective member.

24. The method of manufacturing a fluorescent-material-containing member according to claim 23, wherein
the obtaining of the sintered body includes performing spark plasma sintering or hot pressing sintering.

25. The method of manufacturing a fluorescent-material-containing member according to claim 24, wherein
the fluorescent member includes the fluorescent material having an oxide containing aluminum, and
the light-reflective member contains aluminum oxide.

26. The method of manufacturing a fluorescent-material-containing member according to claim 22, further comprising
singulating the sintered body after the removing of the part of the sintered body so that at least one of the first surface and the second surface of the fluorescent-material-containing member obtained after the singulating of the sintered body includes the light-reflective member around the fluorescent member.

27. The method of manufacturing a fluorescent-material-containing member according to claim 13, wherein
the singulating of the sintered body includes dividing the light-reflective member in the sintered body at prescribed locations.

28. The method of manufacturing a fluorescent-material-containing member according to claim 21, wherein
the singulating of the sintered body includes dividing the light-reflective member in the sintered body at prescribed locations.

29. The method of manufacturing a fluorescent-material-containing member according to claim 26, wherein
the singulating of the sintered body includes dividing the light-reflective member in the sintered body at prescribed locations.

* * * * *